(12) United States Patent
Lu et al.

(10) Patent No.: US 12,019,536 B2
(45) Date of Patent: Jun. 25, 2024

(54) DEBUGGING MANAGEMENT PLATFORM AND OPERATING METHOD FOR THE SAME

(71) Applicant: REALTEK SEMICONDUCTOR CORP., Hsinchu (TW)

(72) Inventors: Shun-Yen Lu, Hsinchu (TW); Ching-Tung Wu, Hsinchu (TW); Jun-Ru Chang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 67 days.

(21) Appl. No.: 17/723,219

(22) Filed: Apr. 18, 2022

(65) Prior Publication Data
US 2023/0041147 A1 Feb. 9, 2023

(30) Foreign Application Priority Data
Aug. 6, 2021 (TW) ................. 110129010

(51) Int. Cl.
| | | |
|---|---|---|
| *G06F 21/50* | (2013.01) | |
| *G06F 9/44* | (2018.01) | |
| *G06F 11/00* | (2006.01) | |
| *G06F 11/36* | (2006.01) | |

(Continued)

(52) U.S. Cl.
CPC ...... *G06F 11/3664* (2013.01); *G06F 11/3688* (2013.01); *G06F 11/3696* (2013.01)

(58) Field of Classification Search
CPC .............. G06F 21/6218; G06F 11/362; G06F 11/3664; G06F 16/2379; G06F 11/3688; G06F 11/3696; G06F 11/364; G06F 9/4552; G06F 11/3624; G06F 8/41; G06F 11/3644; G06F 11/366; G06F 11/0706; G06F 11/0778; G06F 8/33; G06F 11/0748; G06F 11/3648; G06F 11/3656; G06F 21/53; G06F 21/74; G06F 9/45558
See application file for complete search history.

(56) References Cited

U.S. PATENT DOCUMENTS

| | | | |
|---|---|---|---|
| 8,925,077 B2 * | 12/2014 | Matenaar | ............... G06F 21/52 726/22 |
| 9,262,300 B1 | 2/2016 | Haba et al. | |
| 10,594,733 B2 | 3/2020 | Feiertag et al. | |

(Continued)

*Primary Examiner* — Thuy Dao
(74) *Attorney, Agent, or Firm* — Li & Cai Intellectual Property (USA) Office

(57) ABSTRACT

A debugging management platform and an operating method for the same are provided. In the operating method, the debugging management platform operates a debugging agent service for establishing a debugging channel between a software development platform and a test platform. When receiving debugging packets are issued by the software development platform or the test platform, the debugging agent service analyzes the debugging packets and checks if the debugging packets meet an information security standard. The debugging packets are forwarded to the test platform or the software development platform if the debugging packets meet the information security standard. If the debugging packets do not meet the information security standard, the debugging packets are not forwarded, so as to ensure information security of the debugging packets that are forwarded between different environments.

18 Claims, 5 Drawing Sheets

(51) Int. Cl.
*G06F 21/44* (2013.01)
*H04L 29/06* (2006.01)

(56) References Cited

U.S. PATENT DOCUMENTS

| | | | |
|---|---|---|---|
| 2016/0274811 A1* | 9/2016 | Huang | G06F 3/0629 |
| 2020/0348361 A1* | 11/2020 | Kurts | H04L 9/0894 |
| 2021/0240839 A1* | 8/2021 | Tsirkin | G06F 21/554 |
| 2022/0182224 A1* | 6/2022 | Abe | H04L 9/0825 |

* cited by examiner

DEBUGGING MANAGEMENT PLATFORM AND OPERATING METHOD FOR THE SAME

CROSS-REFERENCE TO RELATED PATENT APPLICATION

This application claims the benefit of priority to Taiwan Patent Application No. 110129010, filed on Aug. 6, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a security measure for software debugging, and more particularly to a debugging management platform and an operating method for the same, so as to securely transfer debugging data between a software development platform and a test platform.

BACKGROUND OF THE DISCLOSURE

A conventional software development platform allows users to log on and develop software thereon, and to conduct remote debugging from a computer. This has become one solution for software developers to remotely develop and debug various types of software.

FIG. 1 is a schematic diagram depicting a conventional software development and testing platform. A software development platform 10 provides a user with a service of developing software remotely. The software development platform 10 allows the user to write source codes 101 and produce an execution file 103 by a compiling process. A debugger 105 is used to debug the source codes 101. After a debugging process is completed, the execution file 103 can be uploaded to a test platform 12 for testing the software. If any problem is found or re-compilation is required, the user needs to update the source codes 101, re-compile, debug and produce a new execution file 103.

In an example shown in FIG. 1, the software development platform 10 is, for example, a workstation or a server, and the test platform 12 can be an electronic device (such as a mobile device, a personal computer or a specific device) that is used to execute the execution file 103. While software development is in operation, a debugging channel is established by a communication port (e.g., TCP and USB), and a debugging protocol is provided by the test platform 12. The debugging protocol can be a remote serial protocol, such as GNU debugger (GDB). After the debugging channel is established, the debugger 105 of the software development platform 10 loads the execution file 103 produced by the software development platform 10 to the test platform 12 via the debugging channel. The debugger 105 also checks the source codes 101 and the execution file 103 in the software development platform 10, and tests the source codes 101 in the test platform 12 via the debugging channel. In the debugging process, the debugger 105 sets break points in the source codes 101, executes program codes in a single-stepping mode, and displays information of a buffer and a memory of the test platform 12.

During development of software, in addition to basic debugging functions, a debugging tool also supports various powerful functions, so as to assist a developer to test and debug source codes more efficiently. However, the debugging tool generally lacks information security measures for a development environment. Therefore, sensitive and confidential data (e.g., copyrighted source codes and keys) in the development environment may be transferred to an unauthorized device due to a debugging requirement.

For example, an Android debug bridge (ADB) of an Android (R) development environment provides functions of data transferring and remote login, so that the user is allowed to transmit developed data to an Android-based device via a USB or TCP. Further, a debugger in compliance with a GDB remote serial protocol allows the user to write data into a memory of a device through a write memory command. Accordingly, the conventional technology allows the user to write the sensitive and confidential data into the memory of the device, and also to retrieve the sensitive and confidential data from the memory of the device by a specific application in the device. Therefore, since the above-mentioned development environment may be under threat of insufficient information security, management of the debugging channel used for software debugging is one of the issues that need to be addressed.

SUMMARY OF THE DISCLOSURE

In response to the above-referenced technical inadequacies, i.e., a debugging channel for information security purposes being not established between a software development end and a test end of a conventional software development system, the present disclosure provides a debugging management platform and an operating method for the same. The debugging management platform is an independent platform or a software-implemented approach that is used to provide a security measure adapted to a debugging process. In one aspect of the present disclosure, the debugging management platform is connected with a software development platform and a test platform. The debugging management platform operates a debugging agent service by steps as follows.

The debugging agent service is operated to receive debugging packets generated on the software development platform and forward the debugging packets to a destination, i.e., the test platform. Alternatively, the debugging packets are issued from the test platform and forwarded to another destination, i.e., the software development platform. The debugging agent service analyzes the debugging packets and checks if the debugging packets meet an information security standard. An examination result is accordingly generated. The information security standard is used to check if the debugging packets are sniffed and if data carried by the debugging packets includes sensitive and confidential data.

Next, according to the examination result, the debugging agent service determines whether or not the debugging packets are forwarded to the test platform or the software development platform. Specifically, if the examination result indicates that the debugging packets meet the information security standard, the debugging packets can be forwarded to the test platform or the software development platform. However, if the examination result indicates that the debugging packets do not meet the information security standard, the debugging packets are not forwarded, and a record is created.

Further, the debugging agent service can enable a packet encryption function for encrypting the debugging packets and transferring the debugging packets to the test platform or the software development platform.

Still further, the debugging management platform provides a permission management service to authenticate a user logging on the debugging management platform, so as to confirm use permission of the user. The debugging management platform also provides an event viewing service, which allows the user to view software development content recorded in the debugging management platform according to the use permission of the user.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
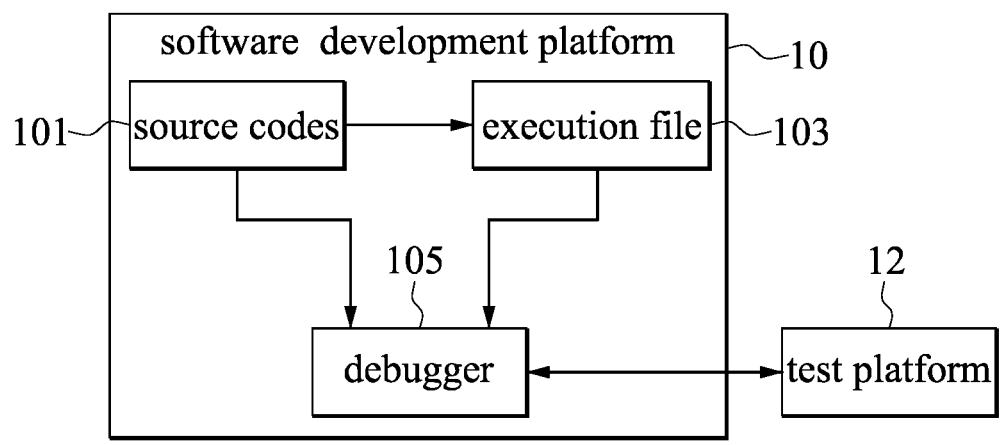
FIG. 1 is a schematic diagram depicting a conventional framework of a software development platform and a test platform.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure provides a debugging management platform and an operating method for the same. One of the objectives of the debugging management platform is to ensure information security in a process of software development and debugging. In particular, one debugging management platform that can securely transfer debugging messages between a software development platform and a test platform is provided. The debugging management platform is an independent platform or a software-implemented approach that provides a security measure in the process of debugging. In one aspect of the present disclosure, the debugging management platform establishes a debugging channel that allows a software developer to upload or download debugging packets. The debugging management platform can automatically take over to confirm if the debugging packets meet an information security standard.

Figure 2:
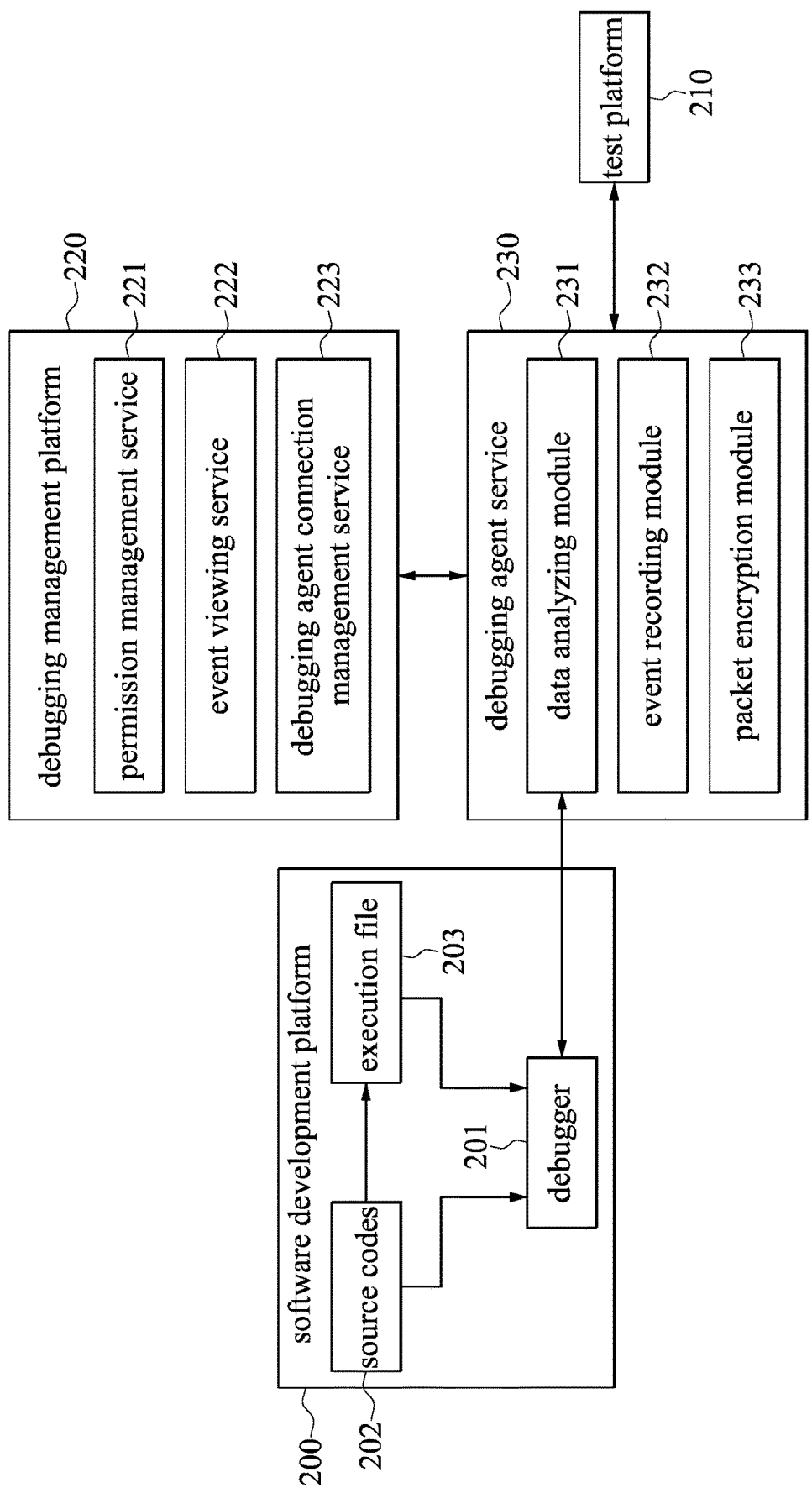
FIG. 2 is a schematic diagram depicting a system framework of a debugging management platform according to one embodiment of the present disclosure.

Reference is made to FIG. 2, which is a schematic diagram depicting a system framework of the debugging management platform according to one embodiment of the present disclosure.

A software development platform 200 can be an independent workstation or a server. Various software tools that users can use to develop software are provided in the software development platform 200. For example, the software tools allow the users to edit source codes 202 and to produce an execution file 203 by compiling the source codes 202. A debugger 201 is provided to debug both the source codes 202 and the execution file 203, and also to debug the messages transferred to the test platform 210.

In particular, a debugging management platform 220 is provided between the software development platform 200 and the test platform 210. The debugging management platform 220 can be an external server or a software sequence operated in a server. Major functions of the debugging management platform 220 include managing use permission of a debugging agent service 230, providing records, and checking access records and information security events. The debugging management platform 220 is able to analyze and filter data to be transferred in the debugging process instantly, and then filter out high-risk data for reducing the risk of leaking sensitive and confidential data via the debugging channel. Furthermore, the debugging management platform 220 can also provide a real-time analysis result when analyzing packets recorded by the debugging agent service 230, and sniff the debugging packets for a follow-up information security event analysis and tracking. The debugging agent service 230 can activate an encryption function for ensuring security and accuracy.

The debugging management platform 220 provides a permission management service 221, an event viewing service 222 and a debugging agent connection management service 223 by means of software. The permission management service 221 is used to manage identification of the users who log on the debugging management platform 22 and their use permissions, so that an administrator of the debugging management platform 220 can manage the use permission of the debugging agent service 230. For example, through the debugging management platform 220, the administrator can manage user accounts, a network address and machine identification data of the software development platform 200, setting of the debugger 201, and setting of a network address, a communication port, a machine identification data and an expiration time limit of the test platform 210 (which is an environment to be tested).

The event viewing service 222 is provided for the administrator to view the various messages transferred between the software development platform 200 and the test platform 210. The messages can be use records of the users, transfer records of the debugging packets and records of information security events. Further, the event viewing service 222 allows the software developer to view his own development content according to his use permission. The debugging agent connection management service 223 is provided for the administrator and the users to set up the debugging agent service 230 specific to the software to be developed. For example, the debugging agent service 230 can be initiated or terminated according to the use permission of the user.

Specifically, the system-end software development platform 200 and the user (or developer)-end test platform 210 are two environments with different security trust levels. The debugging management platform 220 provides the debugging agent service, so as to establish a secure transmission channel that implements a mechanism to separate the two environments involving different information security concerns. A conventional connection that allows the test platform 210 to directly access the software development platform 200 is replaced by the secure transmission channel. Further, the debugging management platform 220 can be used to monitor the messages to be transferred during debugging of the software via the secure transmission channel.

The debugging agent service 230 can be a daemon program operating in a background of a server, a computer host or the above-mentioned platforms. When the debugging agent service 230 operates, the daemon program runs as a background process in the debugging management platform 220, and the debugging agent service 230 assists the software developer to establish a debugging channel between the software development platform 200 and the test platform 210 for connecting the environments with different security and trust levels, so as to monitor and transfer the debugging packets between the software development platform 200 and the test platform 210.

Based on its software-implemented functions, the debugging agent service 230 can be separated into a data analyzing module 231, an event recording module 232 and a packet encryption module 233. The data analyzing module 231 is used to analyze the debugging packets issued by the software development platform 200 or the test platform 210 in real time. An information security standard built in the data analyzing module 231 is used to filter out the sensitive and confidential data carried in the debugging packets. The event recording module 232 is used to record the access records of the debugging agent service 230, sniff the debugging packets, and record events formed by the data analyzing module 231, so that the administrator can view the events via the debugging management platform 220. The packet encryption module 233 can be activated according to the needs of the administrator and the users. Through cooperation with the environment corresponding to the debugger or the test platform 210, the packet encryption module 233 can encrypt the debugging packets to be transferred to the test platform 210 via the debugging channel, thereby enhancing security and accuracy for the debugging process.

In one embodiment of the present disclosure, the administrator of the debugging management platform 220 can be an administrator for information security management, or a unit supervisor of an enterprise or an organization. The debugging management platform 220 allows the administrator to conduct information security management for the software development platform 200. The users can be the software developers or software debugging personnel. The users can develop software on the software development platform 200 that is under control, and can also debug the software on the test platform 210 that is not under information security control. The software development platform 200 can be a software development environment that implements information security control management, such as a workstation controlled by a computer room that is under information security control. The software development platform 200 only allows the user to log in through a terminal device or remote access software. The software development platform 200 can also be a user-end device under information security control, and no user is allowed to directly link to an environment under test via the communication port for debugging purposes. The software development platform 200 includes software development tools required by the users. The software development tools are, for example, a library, an editor, a compiler and the debugger 201 for the source codes 202. While compiling the execution file 203, the execution file 203 can be loaded to the test platform 210 for testing and debugging via the debugging management platform 220.

The test platform 210 is designated as an environment for executing and testing the execution file 203. The test platform 210 can be an embedded development board, a field programmable gate array (FPGA) circuit, a computer device, or a proprietary computer-based demo board. The test platform 210 provides the communication port required for remote debugging, so as to establish the debugging channel. Since the test platform 210 is an environment with limited resources, the software development platform 200 cannot allow the administrator to implement strict information security control management. In addition, the test platform 210 and the software development platform 200 are two environments with different security levels and trust degrees. Therefore, the information security approach provided in the software development platform 200 can be used to ensure the information security of the debugging packets and the various messages transferred between the test platform 210 and the software development platform 200.

It should be noted that the environments (such as the software development platform 200 and the test platform 210) are provided for illustrative purposes only, and are not to be construed as limiting the scope of the present disclosure. The debugging management platform 220 and the operating method can be adapted to more complicated circumstances. For example the debugging agent service 230 running in the debugging management platform 220 can support multiple development environments (such as the software development platform 200) and multiple test environments (such as the test platform 210) at the same time. Furthermore, multiple proprietary debugging agent services 230 can be used to support an environment with a single software development environment and a single test environment.

Figure 3:
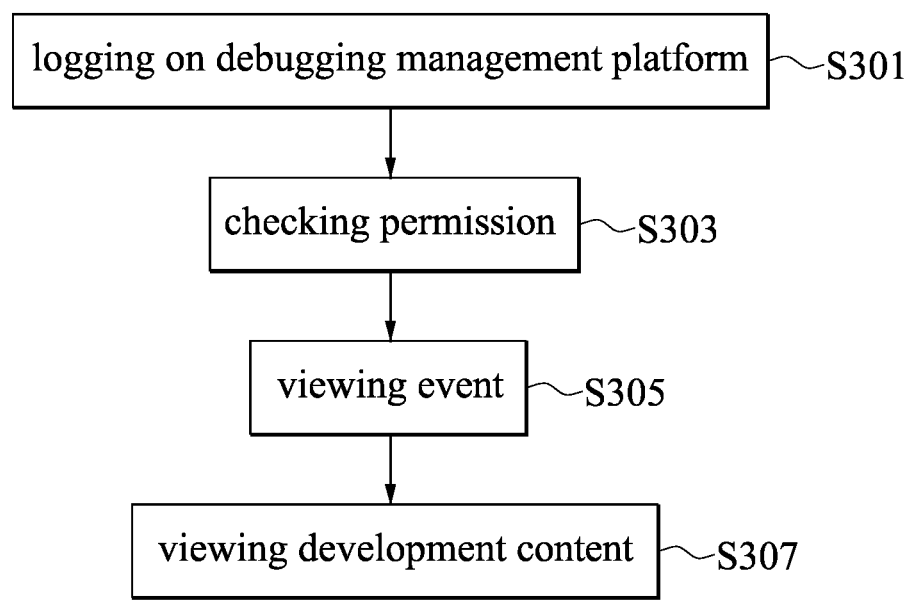
FIG. 3 is a flowchart illustrating a process of logging on the debugging management platform according to one embodiment of the present disclosure.

FIG. 3 shows a flowchart describing a process of logging on the debugging management platform according to one embodiment of the present disclosure.

The above-mentioned debugging management platform interconnects the software development platform and the test platform. A number of platforms to be connected by the debugging management platform depends on a processing capacity of the debugging management platform. The debugging management platform operates a debugging agent service that allows the administrator or the common user (such as a software developer) to log on the debugging management platform remotely (step S301). An identity authentication mechanism adopted by the debugging management platform can be, but not limited to, an Open ID, a light-weighted directory access protocol (LDAP), and an active directory (AD). The sequences operated in the debugging management platform includes: a permission management service, an event viewing service, and a debugging agent connection management service. After identify authentication is completed, the debugging management platform checks permission of the administrator or the common user (step S303). The debugging management platform enables the administrator to view events recorded in a storage device or a database (step S305), or enables the common user to view the development contents recorded by the debugging management platform (step S307).

Figure 4:
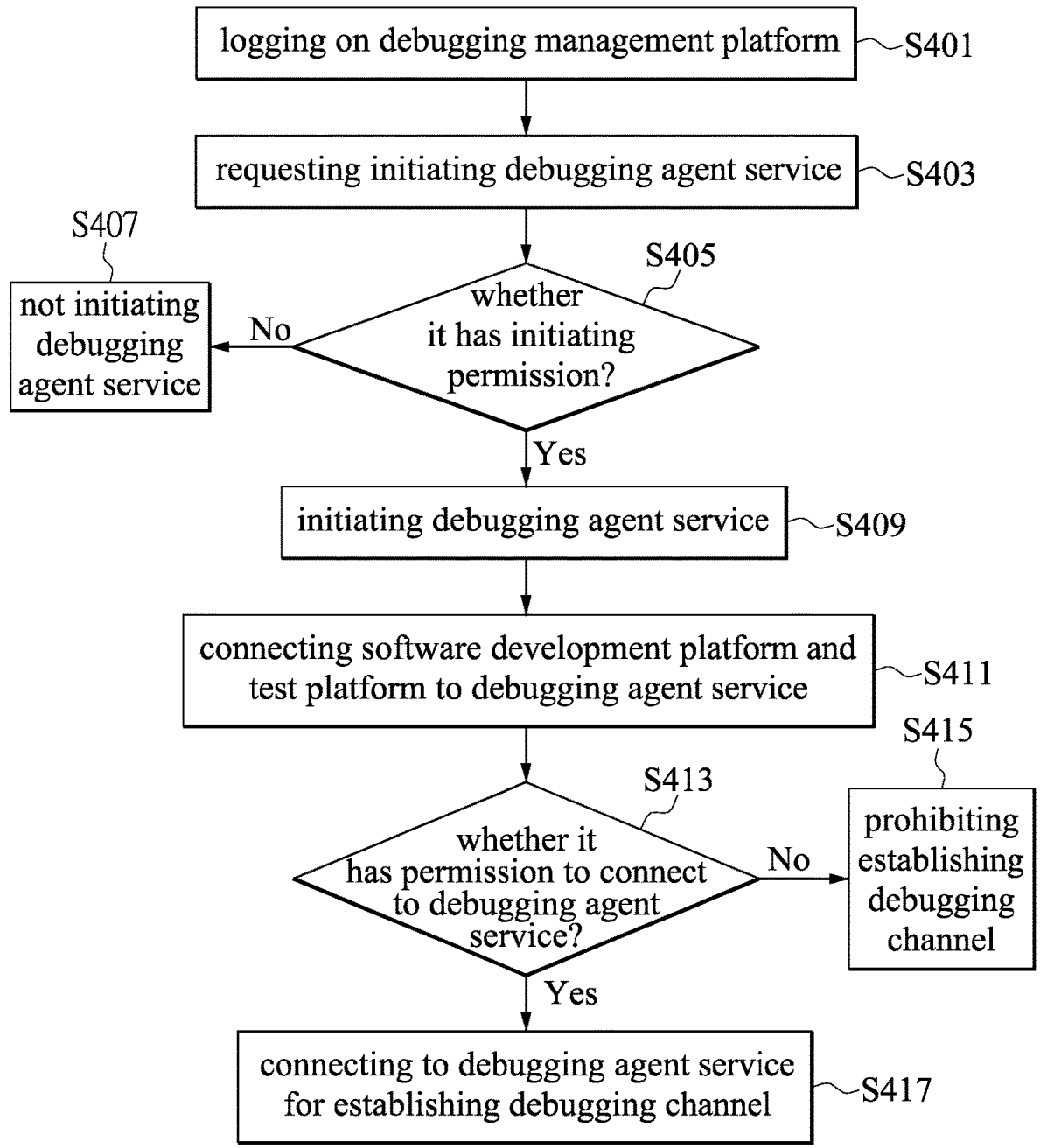
FIG. 4 is a flowchart illustrating a process of establishing a debugging channel through the debugging management platform according to one embodiment of the present disclosure.

FIG. 4 is a flowchart describing a process of establishing a debugging channel by the debugging management platform according to one embodiment of the present disclosure. The process also describes an operation process for initiating the debugging agent service in the debugging management platform.

In the beginning, the administrator or the common user logs on the debugging management platform (step S401). The user requests for initiation of the debugging agent service (step S403). The permission management service running in the platform determines if the user complies with an initiating permission (step S405). If the service can be initiated according to the user's permission, the debugging agent service is initiated (step S409). Conversely, if the initiating permission is not met, the debugging agent service will not be initiated (step S407).

After the debugging agent service is initiated, the debugging agent connection management service (referring to the debugging agent connection management service 223 in FIG. 2) is enabled to connect the software development platform and the test platform with the debugging agent service (step S411), and then determines if the user complies with the permission to connect with the debugging agent service (step S413). The permission can be authenticated according to an identity of the user and other identifiable information (such as a network address of the user-end device, a machine identification data, a communication port and a debugging protocol that can be preset for identification). If the user fails to comply with the permission requirement, the user is prohibited from establishing the debugging channel via the debugging agent service (step S415). In the meantime, the event viewing service of the debugging management platform records this event. If the user complies with the permission to connect with the debugging agent service, the debugging agent service is enabled to interconnect with the software development platform and the test platform, so as to establish the debugging channel between the debugging agent service and the test platform and between the software development platform and the debugging agent service (step S417). The communication port required by the debugging channel is also activated, by which the debugging management platform is able to transfer and monitor the debugging packets. The debugging management platform records the related events.

Figure 5:
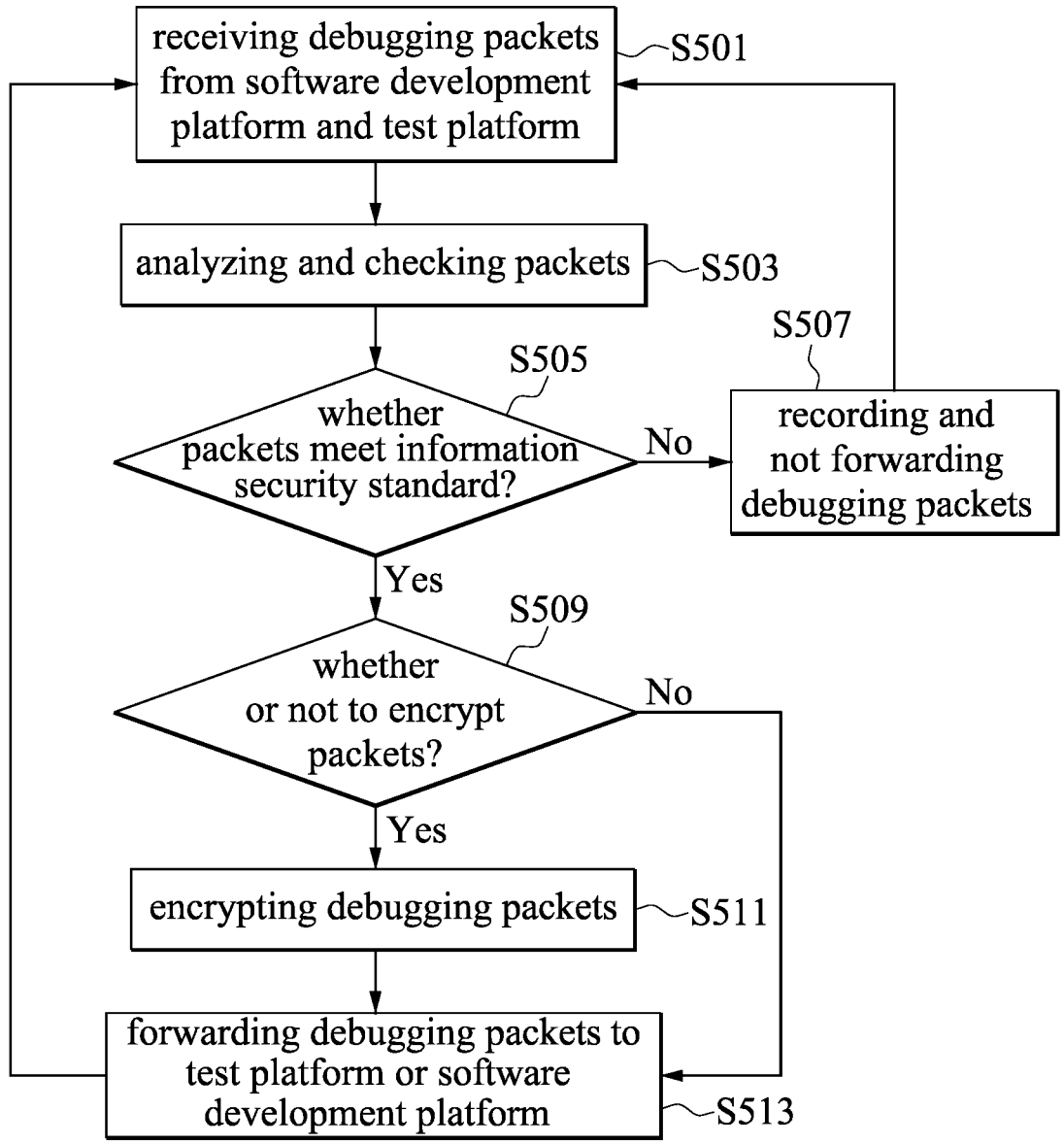
FIG. 5 is a flowchart describing a debugging agent service operated in the debugging management platform according to one embodiment of the present disclosure.

Reference is made to FIG. 5, which is a flowchart describing an operation of the debugging agent service after establishing the debugging channel according to one embodiment of the present disclosure.

The debugging agent service starts to receive the debugging packets from the software development platform or the test platform via the debugging channel (step S501). The software-based debugging agent service relies on the format (e.g., the above-mentioned GDB) of the debugging packets to analyze (via the data analyzing module) and check the debugging packets (step S503). In the meantime, the debugging agent service checks if the debugging packets meet an information security standard regulated by the administrator. Specifically, the debugging agent service can sniff the data carried by the debugging packets, check the data transmitted by the debugging packets, and/or check if any sensitive and confidential data is included in a write-memory debugging command, so as to determine if the debugging packets meet the information security standard (step S505).

After that, an examination result is generated. The debugging agent service determines whether or not to transfer the debugging packets to the test platform or to the software development platform according to the examination result. If the debugging packets do not meet the information security standard, the debugging packets will not be transferred, and the related events will be recorded by the event recording module (step S507). The sequence is terminated and awaits the next debugging packets. Conversely, if the debugging packets are determined to meet the information security standard, the debugging agent service then checks if an encryption scheme is enabled in the debugging packets (step S509), and also checks encryption algorithms and information security approaches supported by the platforms.

In step S509, if it is determined that no encryption scheme is enabled in the debugging packets, encryption/decryption may not be processed. The debugging agent service then transfers the debugging packets to the test platform or the software development platform (step S513). If the debugging packets are issued by the software development platform, the debugging agent service transfers the debugging packets to the test platform when the debugging packets meet the information security standard. If the debugging packets are issued by the test platform, the debugging agent service transfers the debugging packets to the software development platform when the debugging packets meet the information security standard. If the encryption scheme is enabled in the debugging packets, the debugging agent service encrypts the debugging packets with the encryption algorithm and an encryption key via the packet encryption module. For example, an asymmetric encryption (such as RSA) or a transport security layer (TSL) protocol is used to establish an encryption channel (step S511), and the encrypted debugging packets are transferred to the test platform or the software development platform (step S513). The debugging agent service awaits the next packets.

In summation, according to the above embodiments of the debugging management platform and the operating method, the information security mechanism for a debugging process is provided via a debugging channel established between the software development platform and the test platform by the debugging management platform. The debugging management platform is able to prevent the sensitive and confidential data produced by the software development environments from being leaked to an external environment. Particularly, a debugging agent service initiated in the debugging management platform is to establish an indirect debugging channel between the software development platform and the test platform, so as to achieve the following features: implementing centralized management of software debugging requirements via the debugging management platform; assisting in bridging of different debugging channels for platforms with different levels of security and trust degrees; managing use permissions such as user accounts, development environments, test environments and expiration time limits to access the debugging agent service of the debugging management platform; analyzing the debugging packets and examining information security of the debugging packets in real time; preventing the sensitive and confidential data from being leaked via the debugging channel; recording access records and events of the debugging channel, and sniffing the debugging packets via the debugging management platform for a follow-up information security event analysis and tracking; and using an encryption protocol to ensure security and accuracy of the data transferred via the debugging channel.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A debugging management platform stored in a memory connected with a software development platform and a test platform, wherein the debugging management platform operates a debugging agent service by steps of:
   receiving debugging packets issued by the software development platform or the test platform;
   analyzing the debugging packets, checking if the debugging packets meet an information security standard, and generating an examination result; and
   determining whether or not to transfer the debugging packets to the test platform or the software development platform according to the examination result;
   wherein the debugging agent service is used for establishing a debugging channel between the software development platform and the test platform so as to ensure information security of the debugging packets to be transferred;
   wherein, the debugging packets are transferred to the test platform or the software development platform in response to the examination result indicating that the debugging packets meet the information security standard; and the debugging packets are not transferred and a record is created in response to the examination result indicating that the debugging packets do not meet the information security standard.

2. The debugging management platform according to claim 1, wherein the debugging agent service is a daemon program operated in the debugging management platform.

3. The debugging management platform according to claim 1, wherein the debugging management platform is used to manage use permission of the debugging agent service, provide records, and check access records and information security events.

4. The debugging management platform according to claim 1, wherein, if the debugging packets are issued from the software development platform, the debugging packets are transferred to the test platform when the debugging packets are determined to meet the information security standard; wherein, if the debugging packets are issued from the test platform, the debugging packets are transferred to the software development platform when the debugging packets are determined to meet the information security standard.

5. The debugging management platform according to claim 1, wherein the debugging agent service enables a packet encryption function for encrypting the debugging packets and transferring the debugging packets to the test platform or the software development platform.

6. The debugging management platform according to claim 1, wherein the test platform connected with the debugging management platform is an embedded development board, a field programmable gate array circuit or a computer device that is used to execute and test an execution file developed through the software development platform.

7. The debugging management platform according to claim 6, wherein the debugging agent service is a daemon program operated in the debugging management platform.

8. The debugging management platform according to claim 6, wherein the debugging management platform is a server or a software process operating in the server, and is used to manage use permission of the debugging agent service, provide records, and check access records and information security events.

9. The debugging management platform according to claim 8, wherein the debugging management platform is used to analyze and filter data to be transferred in a debugging process and filter high-risk data, to provide a real-time analysis result when analyzing packets recorded by the debugging agent service, and to sniff the debugging packets for information security event analysis and tracking.

10. The debugging management platform according to claim 8, wherein a permission management service is provided for authenticating a user logging on the debugging management platform, so as to confirm use permission of the user.

11. The debugging management platform according to claim 8, wherein an event viewing service is provided for a user to view software development content recorded in the debugging management platform according to use permission of the user.

12. A debugging management platform stored in a memory connected with a software development platform and a test platform, wherein the debugging management platform operates a debugging agent service by steps of:
   receiving debugging packets issued by the software development platform or the test platform;
   analyzing the debugging packets, checking if the debugging packets meet an information security standard, and generating an examination result; and
   determining whether or not to transfer the debugging packets to the test platform or the software development platform according to the examination result;
   wherein the step of checking if the debugging packets meet the information security standard includes sniffing the debugging packets and checking if the debugging packets include sensitive and confidential data.

13. An operating method for a debugging management platform, comprising:
   operating a debugging agent service for establishing a debugging channel between a software development platform and a test platform so as to ensure information security of the debugging packets to be transferred;

receiving debugging packets issued by the software development platform or the test platform;

analyzing the debugging packets, checking if the debugging packets meet an information security standard, and generating an examination result; and determining whether or not to transfer the debugging packets to the test platform or the software development platform according to the examination result;

wherein, the debugging packets are transferred to the test platform or the software development platform in response to the examination result indicating that the debugging packets meet the information security standard; and the debugging packets are not transferred and a record is created in response to the examination result indicating that the debugging packets do not meet the information security standard.

14. The operating method according to claim 13, wherein the debugging agent service is a daemon program operated in the debugging management platform.

15. The operating method according to claim 13, wherein the step of checking if the debugging packets meet the information security standard includes sniffing the debugging packets and checking if the debugging packets include sensitive and confidential data.

16. The operating method according to claim 13, wherein the debugging agent service enables a packet encryption function for encrypting the debugging packets and transferring the debugging packets to the test platform or the software development platform.

17. The operating method according to claim 13, wherein the test platform connected with the debugging management platform is an embedded development board, a field programmable gate array circuit or a computer device that is used to execute and test an execution file developed through the software development platform.

18. The operating method according to claim 17, wherein the debugging agent service is a daemon program operated in the debugging management platform.

* * * * *